Oct. 25, 1938.  W. H. PRATT  2,134,575
MULTIPLE ELEMENT METER
Filed Sept. 9, 1937
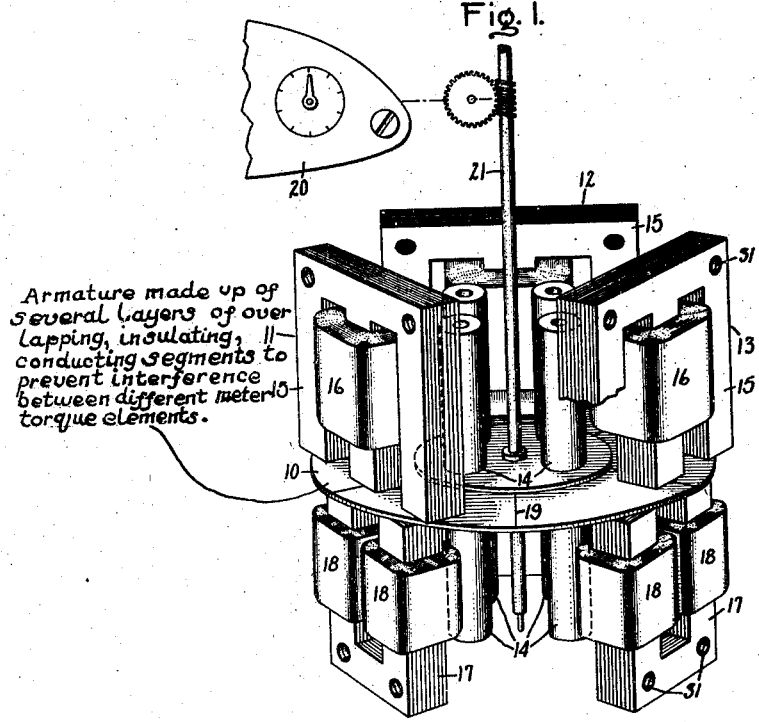
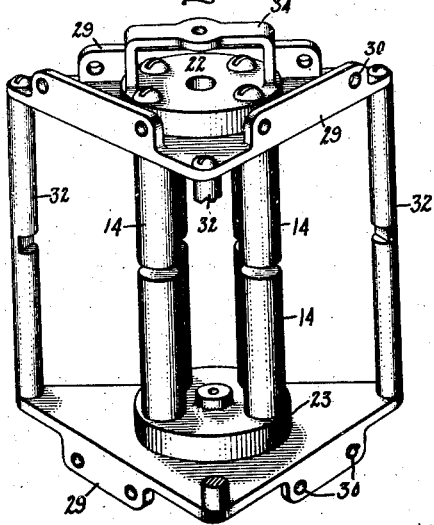
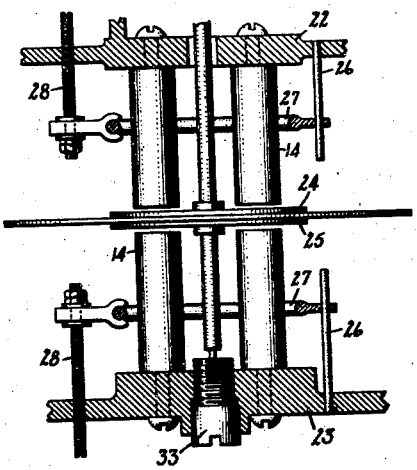
Inventor:
William H. Pratt,
by Harry E. Dunham
His Attorney.

Patented Oct. 25, 1938

2,134,575

UNITED STATES PATENT OFFICE 2,134,575

MULTIPLE ELEMENT METER

William H. Pratt, Lynn, Mass., assignor to General Electric Company, a corporation of New York Application September 9, 1937, Serial No. 163,105

6 Claims. (Cl. 171—264)

My invention relates to electric meters, such as watt-hour meters, and its object is to provide an improved multiple-element or polyphase meter of a compact size comparable to that of a single-element meter.

My invention applies particularly to that type of meter in which a plurality of stationary induction meter driving elements and stationary damping magnets are arranged so as to operate on a single rotary induction disk element. The disk on which the driving elements act is laminated to prevent interference between different driving elements as described in German Patent 433,189, Aug. 21, 1926, and the present invention may be considered as an improvement over the meter described in said German patent.

An important feature of my invention relates to improved damping means for such meters.

The features of my invention which are believed to be novel and patentable will be pointed out in the claims appended hereto. For a better understanding of the invention, reference is made in the following description to the accompanying drawing, Fig. 1 of which is a perspective view of a preferred assembly arrangement of the meter elements of a three-element or three-phase meter; Fig. 2 shows a partially sectional view of the damping magnet assembly and damping disks of Fig. 1; Fig. 3 is a perspective view of the frame structure.

In Fig. 1, I have shown a single disk armature structure 10 having a diameter comparable to that previously used in watt-hour meters generally. Its peripheral portion is acted upon by three watt-hour meter driving elements 11, 12, 13, symmetrically disposed adjacent the periphery of the disk and its central portion is acted upon by drag magnets 14 axially disposed parallel with and equally distant from the shaft above and below and close to the center of the armature. It will be evident that this three-element or three-phase meter has overall dimensions comparable to those of the usual single-element meters and can be housed in a casing substantially no larger than is used to house the ordinary single-phase meter. Each of the watt-hour driving elements include the potential core 15 with its voltage coil 16, the current core 17, and current coils 18.

In order to prevent interference between the three driving elements, the armature disk 10 is preferably made up of several disk layers stacked one above the other, each layer having segments insulated from each other by slits 19 and the segments in different layers overlapping as described in German Patent 433,189. By such arrangement, there is always a complete segment of the armature embraced by each driving element but the currents induced in different disk segments do not spread and intermingle so as to cause interference between different driving elements. The registering mechanism for the meter is indicated at 20, driven from the shaft 21 on which the armature 10 is mounted.

In order to provide sufficient damping for such a meter, a special damping means is necessary. The damping torque should be in the same general relation to the driving torque as in other well designed watt-hour meters and, in this case, the driving torque is in the order of three times that of a single-phase watt-hour meter. To provide satisfactory damping I provide eight permanent magnets 14, four above the armature and four below the armature. These permanent magnets are preferably made of one of the high coercive force materials, such as will produce a strong permanent magnet of small dimensions. The material described in United States Letters Patent No. 1,968,569, July 31, 1934, to Ruder, is satisfactory for this purpose and comprises an age-hardened alloy containing from six per cent to fifteen per cent aluminum, twelve per cent to thirty per cent nickel, an appreciable quantity, up to about ten per cent, of cobalt, and the remainder iron. Owing to the fact that, in Fig. 1, the damping magnets are placed in the space available and close to the shaft, the torque radius of the damping magnets is small and the damping torque must be sufficient to allow for this small torque radius.

The polarities of the several magnets 14 are such as to direct their fluxes through the relatively thick central portion of the armature. Thus, the north pole of a magnet above the disk faces the south pole of a magnet below the disk. Also, the polarities of the magnets above and below the disk must be such as to provide the necessary permanent magnet flux return path between the outer ends of the several magnets. This is provided for by securing the several permanent magnets to magnetic supporting plates 22 and 23, as shown in Fig. 2, at the ends of the magnets remote from the armature. These parallel plates may extend outward to form supporting structure for the watt-hour meter driving elements also as indicated in Fig. 3. As thus arranged, the permanent magnet flux paths are closed except for the armature air gap. The pole pieces of the permanent magnets facing one side of the armature may be arranged N, S, N, S or N, N, S, S, but they should not be all north or all south as this would require another long flux return path between the magnetic plates 22 and 23. As arranged, one pair of permanent magnets above and below the armature furnishes the flux return path for a second pair of permanent magnets above and below the armature.

The disk 10 is generally made of aluminum, is cut by the permanent magnet flux, and furnishes some damping but, in order to bring the damping up to the desired value the central portion of the armature is made of greater conductivity per unit of area than the thinner peripheral portion and I thus provide auxiliary disks 24 and 25 above and below the main disk and of a diameter only sufficient to be cut by the permanent magnet flux. These auxiliary disks 24 and 25, are integral or continuous and are preferably made of copper so as to be the seat of heavy damping currents when the armature is rotated.

To provide for easy adjustment of the damping, I may provide small iron rings, shunt 27 supported by bolts 28, and guide rods 26 by means of which the rings may be moved towards and away from the free polepieces of the permanent magnets at the air gap to shunt more or less of their fluxes. These rings are concentric to the permanent magnets, surround the same and are spaced therefrom as shown. The frame supporting structure shown in Fig. 3 comprises the plates 22 and 23 made of magnetic material to which the permanent magnets are secured. As represented in Fig. 3 these magnetic plates are integral as by welding or otherwise with triangular-shaped extensions having upturned edges 29 provided with bolt holes 30 for securing the three meter-driving magnets, such driving magnet structures also having the bolt holes 31 for the securing bolts not shown.

The plates are secured together at their three outer corners by rods 32 which are preferably made of non-magnetic material. These rods 32 must be located a sufficient distance away from the shaft of the meter so they will extend outside of and clear the meter disk 10 or else be bent outward or notched, as indicated, opposite the disk. The end plates of the meter framework may also support the meter bearings. The lower step bearing is shown at 33, Fig. 2, and a support for the upper guide bearing is shown at 34, Fig. 3.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. An electric meter comprising a rotary shaft, a disk armature of conducting material secured to said shaft, a plurality of stationary electromagnets adjacent the peripheral portion of said armature for driving the same by induction, and damping means for said meter including a smaller diameter conducting disk secured to said shaft closely adjacent the first mentioned disk and stationary permanent magnet means positioned between the driving electromagnets for producing a damping flux through the smaller diameter disk and said armature.

2. An electric meter comprising a rotary shaft, a disk armature of conducting material secured to said shaft, a smaller disk of conducting material secured to said shaft adjacent the armature disk, stationary permanent magnet means for producing damping flux in both of said conducting disks, and a plurality of stationary electromagnets adjacent the peripheral portion of the armature disk for producing induction motor driving fluxes only in said armature disk.

3. An induction meter comprising a shaft, a composite disk armature secured to said shaft, said armature having a relatively thin portion of large diameter and a relatively thicker portion of smaller diameter, the thin portion of large diameter being made up of over-lapping conducting segments which are insulated from each other and the thicker portion of smaller diameter comprising a pair of integral conducting disks on opposite sides of the central portion of the disk of larger diameter, permanent magnet means for producing a damping flux through said smaller diameter portion of said armature and a plurality of induction meter driving magnets for producing driving fluxes only in the larger diameter portion of said armature.

4. In an induction meter an induction disk armature, conductor disks of smaller diameter than said armature increasing the thickness thereof at its central portion, a shaft upon which said armature and disks are secured, two groups of stationary bar-shaped permanent magnets secured parallel to and equally distant from said shaft, the two groups being on opposite sides of the central thicker portion of said armature and arranged to produce damping fluxes therethrough, a plate of magnetic material for supporting each group of permanent magnets at the ends thereof which are furthest from the armature, and means for shunting a small variable portion of the flux produced by said permanent magnets away from the path through the armature.

5. In an induction type meter, a meter shaft, an induction disk armature having a relatively thick central portion and a relatively thin peripheral portion secured to said shaft, a plurality of stationary induction electromagnets operating only on the relatively thin peripheral portion of said armature to produce driving torques thereon, stationary permanent magnets on opposite sides of said armature for producing damping fluxes only through the relatively thick central portion of said armature and means for varying such damping fluxes.

6. In an induction meter, a shaft, an induction disk armature secured to said shaft, said disk having a central portion of appreciably higher conductivity per unit area than the remaining peripheral portion thereof, an even number of bar permanent magnets on opposite sides of the central portion of the armature, said magnets being supported equally distant from and parallel with the shaft with the ends of the magnets which are of opposite magnetic polarity facing each other through the armature and producing damping fluxes therethrough, half of the magnets on each side of the armature having poles of one magnetic polarity facing the armature and the other half having poles of the opposite magnetic polarity facing the armature, and plates of magnetic material supporting the remote ends of said magnets.

WILLIAM H. PRATT.